United States Patent
Biskupski et al.

(10) Patent No.: US 10,500,575 B2
(45) Date of Patent: Dec. 10, 2019

(54) SELECTIVE CATALYTIC REDUCTION CATALYST

(71) Applicant: JOHNSON MATTHEY CATALYSTS (GERMANY) GMBH, Redwitz an der Rodach (DE)

(72) Inventors: Diana Biskupski, Redwitz an der Rodach (DE); Joerg Muench, Redwitz an der Rodach (DE); Irene Piras, Redwitz an der Rodach (DE)

(73) Assignee: JOHNSON MATTHEY CATALYSTS (GERMANY) GMBH, Redwitz an der Rodach (DE)

( * ) Notice: Subject to any disclaimer, the term of this patent is extended or adjusted under 35 U.S.C. 154(b) by 0 days.

(21) Appl. No.: 15/935,082

(22) Filed: Mar. 26, 2018

(65) Prior Publication Data

US 2018/0280948 A1 Oct. 4, 2018

(30) Foreign Application Priority Data

Mar. 31, 2017 (GB) .................................. 1705289.5

(51) Int. Cl.

| | | |
|---|---|---|
| *B01J 29/80* | (2006.01) | |
| *B01D 53/94* | (2006.01) | |
| *B01J 37/02* | (2006.01) | |
| *B01J 23/847* | (2006.01) | |
| *B01J 35/00* | (2006.01) | |
| *B01J 23/22* | (2006.01) | |
| *B01J 29/18* | (2006.01) | |
| *B01J 29/46* | (2006.01) | |
| *B01J 35/04* | (2006.01) | |
| *B01J 37/00* | (2006.01) | |
| *B01J 23/30* | (2006.01) | |
| *B01J 29/48* | (2006.01) | |
| *B01J 21/04* | (2006.01) | |
| *B01J 21/16* | (2006.01) | |
| *B01J 29/76* | (2006.01) | |
| *B01J 35/06* | (2006.01) | |
| *F01N 3/20* | (2006.01) | |
| *F01N 3/28* | (2006.01) | |
| *B01J 29/06* | (2006.01) | |

(52) U.S. Cl.
CPC .......... *B01J 29/80* (2013.01); *B01D 53/9418* (2013.01); *B01D 53/9459* (2013.01); *B01J 21/04* (2013.01); *B01J 21/16* (2013.01); *B01J 23/22* (2013.01); *B01J 23/30* (2013.01); *B01J 23/8472* (2013.01); *B01J 29/18* (2013.01); *B01J 29/46* (2013.01); *B01J 29/48* (2013.01); *B01J 29/76* (2013.01); *B01J 35/0006* (2013.01); *B01J 35/04* (2013.01); *B01J 35/06* (2013.01); *B01J 37/0009* (2013.01); *B01J 37/0215* (2013.01); *B01J 37/0246* (2013.01); *F01N 3/2066* (2013.01); *F01N 3/2825* (2013.01); *B01D 53/9436* (2013.01); *B01D 2255/20707* (2013.01); *B01D 2255/20723* (2013.01); *B01D 2255/20738* (2013.01); *B01D 2255/50* (2013.01); *B01D 2255/911* (2013.01); *B01J 2029/062* (2013.01); *B01J 2229/186* (2013.01); *B01J 2229/42* (2013.01); *F01N 2330/06* (2013.01); *F01N 2330/14* (2013.01); *F01N 2370/04* (2013.01); *F01N 2510/0684* (2013.01); *F01N 2610/02* (2013.01); *Y02C 20/10* (2013.01)

(58) Field of Classification Search
None
See application file for complete search history.

(56) References Cited

U.S. PATENT DOCUMENTS

| | | | |
|---|---|---|---|
| 1,558,598 A * | 10/1925 | Ellis ..................... | C01B 21/265 423/392 |
| 4,503,023 A | 3/1985 | Breck et al. | |
| 4,663,300 A * | 5/1987 | Lester ................ | B01D 53/9418 502/66 |
| 4,735,927 A | 4/1988 | Gerdes et al. | |
| 4,798,813 A | 1/1989 | Kato et al. | |
| 2002/0004446 A1 | 1/2002 | Fischer et al. | |
| 2008/0193358 A1 | 8/2008 | Tzintzos et al. | |
| 2009/0087367 A1 * | 4/2009 | Liu .................... | B01D 53/8634 423/237 |

(Continued)

FOREIGN PATENT DOCUMENTS

| | | |
|---|---|---|
| EP | 0255121 A2 | 2/1988 |
| EP | 2614886 A1 | 7/2013 |

(Continued)

OTHER PUBLICATIONS

Kasaoka et al., Nippon Kagaku Kaishi, 1978, No. 6, pp. 874-881.
Meier, Wm.; The Crystal Structure of Mordenite (ptilolite); Z. Kristallogr., 115, 439-450 (1961).

*Primary Examiner* — Sheng H Davis

(57) ABSTRACT

A selective catalytic reduction catalyst composition for converting oxides of nitrogen ($NO_x$) in an exhaust gas using a nitrogenous reductant comprises a mixture of a first component and a second component, wherein the first component is an admixture of the H-form of an aluminosilicate mordenite zeolite (MOR) and an iron-promoted aluminosilicate MFI zeolite; and the second component is a vanadium oxide supported on a metal oxide support, which is titania, silica-stabilized titania or a mixture of both titania and silica-stabilized titania, wherein the weight ratio of the first component to the second component is 10:90 to 25:75.

19 Claims, No Drawings

(56) References Cited

U.S. PATENT DOCUMENTS

| | | | |
|---|---|---|---|
| 2010/0111796 A1* | 5/2010 | Caudle | B01D 53/9468 |
| | | | 423/239.2 |
| 2010/0196221 A1* | 8/2010 | Ando | B01D 53/925 |
| | | | 422/171 |
| 2013/0190166 A1 | 7/2013 | Kato et al. | |
| 2015/0224486 A1* | 8/2015 | Bauer | B01J 37/0246 |
| | | | 423/213.5 |
| 2017/0007985 A1 | 1/2017 | Bauer et al. | |
| 2017/0128881 A1* | 5/2017 | Goffe | B01J 23/10 |

FOREIGN PATENT DOCUMENTS

| | | |
|---|---|---|
| WO | 8802659 A1 | 4/1988 |
| WO | 9947260 A1 | 9/1999 |
| WO | 2008089957 A1 | 7/2008 |
| WO | 2011080525 A1 | 7/2011 |
| WO | 2011092521 A1 | 8/2011 |
| WO | 2011127505 A1 | 10/2011 |
| WO | 2014027207 A1 | 2/2014 |
| WO | 2014195685 A1 | 12/2014 |
| WO | 2015022399 A2 | 2/2015 |
| WO | 2015145122 A2 | 10/2015 |

\* cited by examiner

SELECTIVE CATALYTIC REDUCTION CATALYST

The present invention relates to a selective catalytic reduction catalyst composition for converting oxides of nitrogen ($NO_x$) in an exhaust gas using a nitrogenous reductant and Applicant's WO 2014/027207 A1 discloses a catalyst composition for treating oxides of nitrogen in exhaust gas derived from a combustion process, such as from an internal combustion engine (whether mobile or stationary), a gas turbine or a coal or oil fired power plant, the catalyst comprising a blend of a first component and second component, wherein the first component is an aluminosilicate or ferrosilicate molecular sieve component and wherein the molecular sieve is either in $H^+$ form or is ion exchanged with one or more transition metals, and the second component is a vanadium oxide supported on a metal oxide support selected from alumina, titania, zirconia, ceria, silica, and combinations thereof.

EP 255121A2 discloses a catalyst comprising (A)' an oxide of titanium, (B)' an oxide of at least one metal selected from tungsten and molybdenum, (C)' an oxide of vanadium, and (D)' at least one metal selected from the group consisting of yttrium, lanthanum, cerium, neodymium, copper, cobalt, manganese and iron, the component (D)' being deposited on a zeolite, which catalyst is for removing nitrogen oxides in an exhaust gas of a fixed generation source containing the nitrogen oxides and an arsenic compound, such as a combustion furnace or a boiler.

U.S. Pat. No. 4,798,813 discloses a catalyst for removing nitrogen oxides from exhaust gases of combustion furnaces containing volatile catalyst poisons such as arsenic, selenium and tellurium. The catalyst comprises a titania having a surface area of 20 $m^2/g$ or less and a zeolite having 0.01 to 20% by weight of copper supported thereon; an average pore diameter of 10 Å or less; and a silica/alumina molar ratio of 10 or more.

U.S. Pat. No. 4,735,927A1 discloses a catalyst for the selective reduction of nitrogen oxides to nitrogen in the presence of ammonia, which is resistant to poisoning by sulfur oxides contained in an exhaust gas. The catalyst is in the form of composite bodies formed from a mixture of anatase (5 to 40% by weight), a zeolite (50 to 90%), a bond material (0 to 30%), and, optionally, a promoter selected from oxides of vanadium, molybdenum, and copper, in the amount of at least 0.1% by weight.

WO 88/02659 discloses a catalyst for removing nitric oxides from flue gases from power plants or industrial furnaces, the catalyst consisting of an acid-resistant zeolite having a pore size of 3 to 6.5 Å in its acid form (H-form). The constituents of the catalyst can include, as additional agents, small quantities of the transition metal elements iron, vanadium, molybdenum, tungsten, nickel, cobalt, copper, chromium and/or uranium. In addition, the catalyst can contain up to 40 wt. % titanium oxide, based on the mass of the catalyst.

US 2002/0004446A1 discloses a catalyst body for breaking down nitrogen oxide in the presence of a reducing agent at temperatures of from 400 to 750° C., the catalyst body comprising: an active material containing a hydrogen-ion-exchanged, acid zeolite and an active component, said active material contains 40-60% by weight of said zeolite and 40-60% by weight of said active component, said active component contains 70-95% by weight of titanium dioxide, 2-30% by weight of tungsten trioxide, 0.1-10% by weight of aluminium oxide and 0.1-10% by weight of silicon dioxide.

WO 2008/089957 A1 discloses a catalyst composition for reducing nitrogen oxides in Diesel exhaust gas, the catalyst comprising at least two oxides selected from $V_2O_5$, $WO_3$, $TiO_2$ and a metal-exchanged noble metal-free zeolite. The exchanged metal is preferably Co, Cu, Fe or Ni, especially Fe. The content of metal-exchanged zeolites in the catalyst composition is limited to less than 10 wt. % with 5-8 wt. % being very especially preferred.

U.S. Pat. No. 4,663,300A discloses a catalyst composition and a process for the reduction of nitrogen oxides in flue gases to nitrogen. The catalyst comprises titania, mordenite and a metal component. The preferred metal component comprises vanadium oxide and tungsten oxide. At least 15 wt. % mordenite is present, with high silica H-mordenite being preferred.

EP 2614886 A1 discloses a NOx reduction catalyst for the catalytic reduction of nitric oxide with ammonia in boiler exhaust gas from combusting high sulphur content coal, coal from the Powder River Basin (USA), biomass etc. also containing catalyst poisons such as arsenic, phosphorus and potassium. Such catalysts require a low ratio of SO2 oxidation to avoid SO3 emission and the formation of so-called "acid rain" and a high activity in oxidising mercury present in the exhaust gas. The catalyst is composed of a catalyst composition that comprises titanium (Ti), an oxide of phosphorous, molybdenum (Mo) and/or tungsten (W), oxide of vanadium (V), and high-silica zeolite that has an SiO2/Al2O3 ratio of not less than 20.

Following continued research in connection with the catalyst formulations disclosed in WO 2014/027207 A1, the inventors have found that a combination (blend) of the H-form of an aluminosilicate mordenite zeolite and an iron-promoted aluminosilicate MFI zeolite as the first component with the second, supported vanadium oxide component has better $NO_x$ conversion and lower or comparable $N_2O$ selectivity (i.e. selective for conversion of $NO_x$ to $N_2$, not $N_2O$), than either the composition including only the H-form of mordenite zeolite disclosed in U.S. Pat. No. 4,663,300A or the composition including only the iron-promoted aluminosilicate MFI zeolite disclosed in WO 2014/027207 A1, particularly at temperatures of up to 400° C. This synergy is defined according to the appended claims and as described hereinbelow.

According to a first aspect the invention provides a catalyst composition for converting oxides of nitrogen ($NO_x$) in an exhaust gas, which catalyst composition comprising a mixture of a first component and a second component, wherein the first component is an admixture of the H-form of an aluminosilicate mordenite zeolite and an iron-promoted aluminosilicate MFI zeolite; and the second component is a vanadium oxide supported on a metal oxide support, which is titania, silica-stabilized titania or a mixture of both titania and silica-stabilized titania, wherein the weight ratio of the first component to the second component is 10:90 to 25:75.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

Furthermore, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

The weight ratio of the H-form of the aluminosilicate mordenite zeolite (MOR) to the iron-promoted aluminosilicate MFI zeolite is preferably from 3:1 to 3:5, most preferably from 1:1 to 3:5. The advantages of these parameters are shown in the Examples hereinbelow.

Optionally, the weight ratio of the first component to the second component is 15:85 to 20:80.

Preferably, where the catalyst composition according to the first aspect of the invention is for extrusion into a substrate, the catalyst composition comprises one or more binder component, wherein the weight ratio of the combined weight of the first and second components to the combined weight of the one or more binder component is from 80:20 to 95:5, preferably 90:10 to 85:15. The one or more binder component can be a clay, e.g. alumina and/or glass fibers.

The MFI Framework type code (defined by the International Zeolite Association) refers to a family of synthetic molecular sieves sharing the same structure. MFI is defined by having a largest pore opening of ten tetrahedral atoms and molecular sieves having this property are referred to in the literature as being "medium pore" molecular sieves. Aluminosilicate molecular sieves are commonly referred to as zeolites. A preferred aluminosilicate zeolite of the MFI Framework type code is ZSM-5. ZSM-5 is known and has been widely studied and characterised. See for example G. T. Kokotailo et al., "Structure of synthetic zeolite ZSM-5", Nature 272, 437-438 (1978). Methods of making ZSM-5 ion-exchange with iron are also known (see e.g. US20100172828 A1). A preferred iron content in the iron-promoted aluminosilicate MFI zeolite for use in the invention is 2-7 wt % such as 3-6 wt. %.

Preferably the silica-to-alumina ratio (SAR) of the aluminosilicate MFI is 20-50. If the SAR is too high, the surface area of the zeolite is reduced and there are too few acid sites effectively to store ammonia and/or for $NO_x$ conversion activity. If the SAR is too low, the zeolite is susceptible to structural disruption and so a collapse in the framework and surface area through hydrothermal ageing in use.

The MOR Framework type code mordenite was originally identified as a natural mineral but it has subsequently been manufactured synthetically (see Meier, W. M., The crystal structure of mordenite (ptilolite) Z. Kristallogr., 115, 439-450 (1961); and U.S. Pat. No. 4,503,023). Although it is possible to use natural mordenite in the present invention provided that suitable steps are taken to remove impurities and counter-ions such as sodium and/or potassium present in the natural material, e.g. washing and ammonium ion-exchange (see e.g. DE102005010221), we prefer to use synthetic aluminosilicate mordenite. The mordenite added to the mixture used to prepare the product according to the invention (see Example 1) can be pre-prepared H-form of mordenite or the ammonium form, which—following calcination—will convert to the H-form as ammonia is removed therefrom.

The SAR of the mordenite of the synthetic aluminosilicate mordenite for use in the invention can be from 10 to 30, for the same reasons as discussed in connection with the Fe-MFI hereinabove. Natural mordenite typically has a SAR of 8 to 12.

Suitable clays include fullers earth, sepiolite, hectorite, a smectite, a kaolin and mixtures of any two or more thereof, wherein the kaolin can be chosen from sub-bentonite, anauxite, halloysite, kaolinite, dickite, nacrite and mixtures of any two of more thereof; the smectite can be selected from the group consisting of montmorillonite, nontronite, vermiculite, saponite and mixtures of any two or more thereof; and the fullers earth can be montmorillonite or palygorskite (attapulgite).

The inorganic fibres can be selected from the group consisting of carbon fibres, glass fibres, metal fibres, boron fibres, alumina fibres, silica fibres, silica-alumina fibres, silicon carbide fibres, potassium titanate fibres, aluminium borate fibres and ceramic fibres. Inorganic fibres can improve the mechanical robustness of the calcined product for use in the preferred automotive applications and during "canning" of the calcined product for use in an automotive exhaust system.

The alumina is preferably gamma alumina. Where an aluminium oxide is used, to ensure the binding with the aluminium oxide, it is advantageous to add an aqueous solution of a water-soluble metal salt to the aluminium oxide or the precursor substance of the aluminium oxide before adding the other starting materials. Alternatively, any other transition alumina, i.e. alpha alumina, beta alumina, chi alumina, eta alumina, rho alumina, kappa alumina, theta alumina, delta alumina, lanthanum beta alumina and mixtures of any two or more such transition aluminas, can be used. The alumina can also be added to the extrudable mixture as a sol, with the benefit that the resulting calcined product is more mechanically robust.

Preferably, to improve the thermal stability of the catalyst and fresh $NO_x$ conversion activity, the metal oxide support of the second component comprises tungsten oxide, molybdenum oxide, both tungsten oxide and molybdenum oxide, but more preferably tungsten oxide.

The vanadium oxide of the second component can comprise iron vanadate because it can provide certain advantages including improved low temperature (180-350° C.) activity and higher temperature stability than vanadium oxide, such as is disclosed in WO 2011/127505.

The catalyst composition can, including any binder, comprise 0.5 to 5.0 weight percent of vanadium calculated as $V_2O_5$, preferably 1.0 to 3.0 wt. %, based on the total weight of the catalyst composition as a whole. This method of calculation applies also where the vanadium component is iron vanadate ($FeVO_4$).

According to a second aspect, there is provided a catalytic washcoat comprising a catalyst composition according to the first aspect of the invention comprising one or more fillers, binders, processing aids, water and dopants. Processing aids can include rheology modifiers for use in such methods as are disclosed in coating methods such as WO 99/047260 A1, WO 2011/080525 A1, WO 2014/195685 A1 or WO 2015/145122 A2 for example.

According to a third aspect, the invention provides a catalyst article comprising a substrate monolith coated with a catalytic washcoat according to the second aspect of the invention. The substrate can be a metal flow-through substrate, a ceramic flow-through substrate, a wall-flow filter, a sintered metal filter or a partial filter.

According to a fourth aspect, a preferred catalyst article comprises the catalyst composition according to the first aspect of the invention in the form of an extruded substrate, preferably a honeycomb monolith. In this instance, preferably, the catalyst composition contains tungstate instead of molybdate.

It will be appreciated that the benefit of the invention, i.e. improved $NO_x$ conversion activity and lower $N_2O$ generation, is obtained independently of whether the catalyst composition is present as a washcoat coated onto an inert substrate or as an extruded substrate.

Methods of making an extruded catalyst article according to the fourth aspect of the invention are known e.g. from WO 2014/027207 A1 and WO 2011/092521 A1 or any of those acknowledged as background art herein. Suitable organic auxiliaries such as binders, fillers, pore modifiers, extrusion lubricants and plasticisers can be added to facilitate mixing to form an homogeneous extrudable mass. The organic auxiliaries may include cellulose, water soluble resins such as polyethylene oxide or polyethylene glycol and are burnt out from the final substrate during calcination.

The catalyst article according to the third or fourth aspects of the invention can comprise a second catalyst composition in the form of a washcoat for selectively reducing $NO_x$ using a nitrogenous reductant and/or for oxidizing $NH_3$, which second catalyst composition is: (a) a catalyst mixture according to the first aspect of the invention; (b) a transition metal promoted molecular sieve; (c) a platinum group metal supported on a metal oxide; or (d) a catalyst comprising vanadium oxide supported on titania. It will be appreciated that option (a) is already defined by the third aspect of the invention and so it can be deleted from any claim dependent on the third aspect claim invention.

The catalyst article of either the third or fourth aspects of the invention can comprise an ammonia slip catalyst (ASC) comprising a first layer of (c) for oxidizing ammonia and a second layer comprising the catalyst according to the first aspect of the invention, wherein the first layer is disposed directly on the substrate and the second layer overlies the first layer. This arrangement is beneficial in that it can promote the following reactions. In the first layer: $2NH_3 + 1.5O_2 \rightarrow N_2 + 3H_2O$ (+NO and/or $NO_2$); and in the second layer: $NO + NH_3 + \frac{1}{4}O_2 \rightarrow N_2 + 3/2H_2O$; or $NO + NO_2 + 2NH_3 \rightarrow 2N_2 + 3H_2O$; or $NO_2 + 4/3NH_3 \rightarrow 7/6N_2 + 2H_2O$. The source of the NO and $NO_2$ in the reactions of the second layer can be the exhaust gas itself and/or side reactions in the first layer, which generate NO or $NO_2$. The source of ammonia in the second layer reactions can be the exhaust gas itself and/or ammonia adsorbed onto components of the second layer from the exhaust gas.

According to a fifth aspect, there is provided an exhaust system for treating exhaust gas comprising a selective catalytic reduction (SCR) catalyst disposed upstream from an ammonia slip catalyst (ASC), wherein at least one of the SCR and the ASC catalyst comprises a catalyst according to the first aspect of the invention.

The exhaust system according to the fifth aspect of the invention can comprise an oxidation catalyst comprising a platinum group metal supported in a metal oxide coated on a substrate monolith and disposed upstream of the SCR catalyst composition. This is to promote oxidation of nitrogen oxide present in the exhaust gas to nitrogen dioxide in an approximate ratio of $4NO:NO_2$ to about $NO:3NO_2$ by volume. This is done to promote a kinetically faster conversion of $NO_x$ than either NO or $NO_2$ alone (see for example S. Kasaoka et al, Nippon Kagaku Kaishi, 1978, No. 6, pp. 874-881).

The SCR catalyst composition according to the invention can be used to treat exhaust gases from stationary sources of $NO_x$ emission, such as gas turbine or a coal or oil fired power plant. In this case, the catalyst composition can be coated onto a so-called plate type substrate of corrugated perforated metal sheet. Catalyst compositions for this application preferably include molybdate instead of tungstate. However, preferably and according to a sixth aspect, the invention provides an automotive vehicular lean burn internal combustion engine comprising an exhaust system according to the fifth aspect according to the invention.

According to a seventh aspect, the invention provides an automotive vehicle comprising an engine according to the sixth aspect of the invention.

According to an eighth aspect, the invention provides a method for treating an exhaust gas, which optionally comprises a ratio of NO to $NO_2$ from about 4:1 to about 1:3 by volume, which ratios may be promoted passively, e.g. by an appropriately designed oxidation catalyst, which method comprising the steps of: contacting an exhaust gas stream containing $NO_x$ and $NH_3$ with a catalyst according to the first aspect of the invention or a catalyst article according to the third or fourth aspects of the invention; and converting at least a portion of the $NO_x$ to $N_2$ and/or converting at least a portion of the $NH_3$ to at least one of $N_2$, NO and $NO_2$ according to the reactions described hereinabove in relation to the first and second layers, wherein the first layer is (c), i.e. a platinum group metal supported on a metal oxide.

In order that the invention may be more fully understood, the following Examples are provided by way of illustration only.

EXAMPLES

Example 1: Preparation of Extruded Honeycomb Substrate

An extruded honeycomb substrate catalyst according to WO 2014/027207 A1 was prepared by firstly mixing a powdered commercially available MFI aluminosilicate zeolite that has been ion-exchanged with >1 wt. % iron, a commercially available powdered H-form of mordenite or a mixture of both the powdered >1 wt. % Fe/MFI aluminosilicate zeolite and the powdered H-form of mordenite with 2 wt. % $V_2O_5$-10 wt. % $WO_3/TiO_2$ balance with inorganic auxiliaries to improve rheology for extrusion and increase mechanical strength of the extrudate. Suitable organic auxiliaries were added to facilitate mixing to form a homogeneous extrudable mass. The extrudable mass was extruded to form a 1-inch diameter×70 mm long cylindrical honeycomb body in the flow-through configuration (i.e. cells open at both ends) having a cell density of 400 cells per square inch and having honeycomb cell wall thicknesses of 11 thousandths of an inch (mil). The extruded honeycomb substrates so formed were then dried and calcined to form the finished product.

The appropriate proportions of the zeolites, $V_2O_5$-$WO_3$/$TiO_2$, inorganic auxiliaries were selected so that—following removal of the organic auxiliaries by calcination—the extruded substrates had the wt. % compositions set out in Table 1 below.

TABLE 1

| Example | V$_2$O$_5$-WO$_3$/TiO$_2$ (wt. %) | Inorganic auxiliaries (wt. %) | Fe-MFI (wt. %) | H-MOR (wt. %) |
|---|---|---|---|---|
| 1 | 71.4 | 12.6 | 10.0 | 6.0 |
| 2 | 71.4 | 12.6 | 8.0 | 8.0 |
| 3 | 71.4 | 12.6 | 4.0 | 12.0 |
| Comparative 1 | 71.4 | 12.6 | 16.0 | 0.0 |
| Comparative 2 | 71.4 | 12.6 | 0.0 | 16.0 |

Example 2: Extruded Honeycomb Substrate Ageing

The extruded catalyst honeycomb substrates resulting from Example 1 were thermally aged (no water added) in an accelerated ageing step either by heating them in an oven in air at above 600° C. for 2 hours (referred to herein as "fresh") or at 650° C. for 100 hours (referred to herein as "aged") to simulate the expected exposure of the honeycomb substrates to automotive vehicular exhaust gases over a vehicle end-of-life, according to European emission standard legislation.

Example 3: Catalyst Performance

The fresh and aged substrates were each exposed to a simulated diesel engine exhaust gas at a space velocity of about 120,000/hour. The simulated exhaust gas contained about 9.3 wt. % O$_2$, about 7.0 wt. % H$_2$O, about 300 ppm NO$_x$ (NO only) about 300 ppm NH$_3$, and the balance N$_2$. The activity of the fresh and aged catalyst substrates to convert NO$_x$ was determined at temperatures of 180, 215, 250, 300 and 400° C. The results for the % NOx conversion data are presented in Tables 2 and 3 (the higher values the better).

The N$_2$O selectivity of the "aged" catalyst substrate samples at 500° C. is shown in Table 3 (the lower values the better). N$_2$O selectivity is determined by the equation:

$$SN_2O = 2*(N_2O\text{-out minus } N_2O\text{-in})/(NO_x\text{-in minus } NO_x\text{-out})*100.$$

TABLE 2

% NOx conversion for Fresh Catalyst Substrate Samples

| Temp (° C.) | Comparative Example 1 | Example 1 | Example 2 | Example 3 | Comparative Example 2 | % difference between Example 2 and Comparative Example 2 |
|---|---|---|---|---|---|---|
| 180 | 22.9 | 22.2 | 19.0 | 17.1 | 18.5 | 0.5 |
| 215 | 47.0 | 48.0 | 42.0 | 39.0 | 41.4 | 0.6 |
| 250 | 67.7 | 69.2 | 62.7 | 60.3 | 62.2 | 0.5 |
| 300 | 83.6 | 84.8 | 79.6 | 78.5 | 79.0 | 0.6 |
| 400 | 91.5 | 93.0 | 89.4 | 89.4 | 89.2 | 0.2 |
| 500 | 82.0 | 87.7 | 83.3 | 83.2 | 82.8 | 0.5 |

TABLE 3

% NOx conversion for Aged Catalyst Substrate Samples

| Temp (° C.) | Comparative Example 1 | Example 1 | Example 2 | Example 3 | Comparative Example 2 | % difference between Example 2 and Comparative Example 2 |
|---|---|---|---|---|---|---|
| 180 | 4.1 | 9.1 | 9.2 | N/A | 8.7 | 0.5 |
| 215 | 9.5 | 21.6 | 22.5 | 22.2 | 21.3 | 1.2 |
| 250 | 18.5 | 40.4 | 42.0 | 41.8 | 40.5 | 1.5 |
| 300 | 36.0 | 65.8 | 67.6 | 67.7 | 65.9 | 1.7 |
| 400 | 56.3 | 80.5 | 82.5 | 82.8 | 82.6 | −0.1 |
| 500 | 24.4 | 58.6 | 63.3 | 66.3 | 68.0 | −4.7 |

TABLE 4

N$_2$O Selectivity by "Aged" Catalyst Substrates at 500° C.

| | Comparative Example 1 | Example 1 | Example 2 | Example 3 | Comparative Example 2 |
|---|---|---|---|---|---|
| N$_2$O selectivity | 26.8 | — | 13.0 | — | 10.4 |

It can be seen from the data presented in Tables 2, 3 and 4 that the fresh NOx conversion activity for Examples 2 and 3 is similar to Comparative Example 2, whereas Example 1 is better than Comparative Example 2 and similar to Comparative Example 1. The aged NOx conversion activity of all Examples are better than Comparative Example 1 and are better than (Example 2, particularly at ≤400° C.) or similar to Comparative Example 2. The N$_2$O selectivity data in Table 4 show that Example 2 has similar N$_2$O selectivity than Comparative Example 2 and a better N$_2$O selectivity than Comparative Example 1.

Overall, these data show an order of preference of Example 2>Example 1>Example 3.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

For the avoidance of doubt, the entire contents of all documents acknowledged herein are incorporated herein by reference.

The invention claimed is:

1. A selective catalytic reduction catalyst composition for converting oxides of nitrogen (NO$_x$) in an exhaust gas using a nitrogenous reductant, which catalyst composition comprising a mixture of a first component and a second component, wherein the first component is an admixture of the H-form of an aluminosilicate mordenite zeolite (MOR) and an iron-promoted aluminosilicate MFI zeolite; and the second component is a vanadium oxide supported on a metal oxide support, which is titania, silica-stabilized titania or a mixture of both titania and silica-stabilized titania, wherein the weight ratio of the first component to the second component is 10:90 to 25:75 and wherein the weight ratio of the H-form of the aluminosilicate mordenite zeolite (MOR) to the iron-promoted aluminosilicate MFI zeolite is from 3:1 to 3:5.

2. A catalyst composition according to claim 1, wherein the weight ratio of the H-form of the aluminosilicate mordenite zeolite (MOR) to the iron-promoted aluminosilicate MFI zeolite is from 1:1 to 3:5.

3. A catalyst composition according to claim 1, wherein the weight ratio of the first component to the second component is 15:85 to 20:80.

4. A catalyst composition according to claim 1, comprising one or more binder component, wherein the weight ratio of the combined weight of the first and second components to the combined weight of the one or more binder component is from 80:20 to 95:5.

5. A catalyst composition according to claim 4, wherein the one or more binder component is a clay, alumina and/or glass fibers.

6. A catalyst composition according to claim 4, wherein the metal oxide support of the second component comprises tungsten oxide.

7. A catalyst composition according to claim 4, wherein the vanadium oxide of the second component comprises iron vanadate.

8. A catalyst composition according to claim 4, wherein the mixture comprises 0.5 to 5.0 weight percent vanadium calculated as $V_2O_5$ based on the total weight of the catalyst composition as a whole.

9. A catalytic washcoat comprising a catalyst composition according to claim 4, comprising one or more fillers, binders, processing aids, water and dopants.

10. A catalyst article comprising a substrate monolith coated with a catalytic washcoat according to claim 9, wherein the substrate is a metal flow-through substrate, a ceramic flow-through substrate, a wall-flow filter, a sintered metal filter or a partial filter.

11. A catalyst article according to claim 10, comprising a second catalyst composition in the form of a washcoat for selectively reducing $NO_x$ using a nitrogenous reductant and/or for oxidizing $NH_3$, which second catalyst composition is:
   (a) a catalyst mixture comprising a mixture of a first component and a second component, wherein the first component is an admixture of the H-form of an aluminosilicate mordenite zeolite (MOR) and an iron-promoted aluminosilicate MFI zeolite; and the second component is a vanadium oxide supported on a metal oxide support, which is titania, silica-stabilized titania or a mixture of both titania and silica-stabilized titania, wherein the weight ratio of the first component to the second component is 10:90 to 25:75 and wherein the weight ratio of the H-form of the aluminosilicate mordenite zeolite (MOR) to the iron-promoted aluminosilicate MFI zeolite is from 3:1 to 3:5;
   (b) a transition metal promoted molecular sieve;
   (c) a platinum group metal supported on a metal oxide; or
   (d) a catalyst comprising vanadium oxide supported on titania.

12. A catalyst article according to claim 11, wherein the substrate comprises an ammonia slip catalyst (ASC) comprising a first layer of (c) for oxidizing ammonia and a second layer comprising a mixture of a first component and a second component, wherein the first component is an admixture of the H-form of an aluminosilicate mordenite zeolite (MOR) and an iron-promoted aluminosilicate MFI zeolite; and the second component is a vanadium oxide supported on a metal oxide support, which is titania, silica-stabilized titania or a mixture of both titania and silica-stabilized titania, wherein the weight ratio of the first component to the second component is 10:90 to 25:75 and wherein the weight ratio of the H-form of the aluminosilicate mordenite zeolite (MOR) to the iron-promoted aluminosilicate MFI zeolite is from 3:1 to 3:5, wherein the first layer is disposed directly on the substrate and the second layer overlies the first layer.

13. A catalyst article according to claim 9 in the form of an extruded substrate.

14. A method for treating an exhaust gas, which comprises a ratio of NO to $NO_2$ from about 4:1 to about 1:3 by volume, which method comprising the steps of:
   (i) contacting an exhaust gas stream containing $NO_x$ and $NH_3$ with a catalyst according to claim 13; and
   (ii) converting at least a portion of the $NO_x$ to $N_2$ and/or converting at least a portion of the $NH_3$ to at least one of $N_2$ and $NO_2$.

15. An exhaust system for treating exhaust gas comprising a selective catalytic reduction (SCR) catalyst disposed upstream from an ammonia slip catalyst (ASC), wherein at least one of the SCR and the ASC catalyst comprises a catalyst according to claim 9.

16. An exhaust system according to claim 15, comprising an oxidation catalyst comprising a platinum group metal supported in a metal oxide coated on a substrate monolith and disposed upstream of the SCR catalyst composition.

17. An automotive vehicular lean burn internal combustion engine comprising an exhaust system according to claim 15.

18. An automotive vehicle comprising an engine according to claim 17.

19. A method for treating an exhaust gas, which comprises a ratio of NO to $NO_2$ from about 4:1 to about 1:3 by volume, which method comprising the steps of:
   (i) contacting an exhaust gas stream containing $NO_x$ and $NH_3$ with a catalyst according to claim 9; and
   (ii) converting at least a portion of the $NO_x$ to $N_2$ and/or converting at least a portion of the $NH_3$ to at least one of $N_2$ and $NO_2$.

* * * * *